US007144932B2

(12) United States Patent
Hokkirigawa et al.

(10) Patent No.: US 7,144,932 B2
(45) Date of Patent: Dec. 5, 2006

(54) LOW-FRICTION, HIGH-DISPERSION SYNTHETIC RESIN COMPOSITION CONTAINING FINE PARTICLES OF RB CERAMIC OR CRB CERAMIC AND A METHOD FOR ITS PREPARATION

(75) Inventors: Kazuo Hokkirigawa, Sendai (JP); Rikuro Obara, Miyota-Machi (JP)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/377,849

(22) Filed: Feb. 28, 2003

(65) Prior Publication Data

US 2003/0229161 A1   Dec. 11, 2003

(30) Foreign Application Priority Data

| Mar. 1, 2002 | (JP) | ............................. 2002-055307 |
| Mar. 1, 2002 | (JP) | ............................. 2002-055308 |
| Mar. 7, 2002 | (JP) | ............................. 2002-062406 |
| Mar. 7, 2002 | (JP) | ............................. 2002-062412 |
| Jun. 17, 2002 | (JP) | ............................. 2002-176436 |
| Sep. 18, 2002 | (JP) | ............................. 2002-272147 |

(51) Int. Cl.
  C08L 11/00   (2006.01)
  C08L 99/00   (2006.01)

(52) U.S. Cl. ............................. 524/15; 524/9; 524/579; 525/579; 525/390; 525/480; 525/540

(58) Field of Classification Search .................. 524/15, 524/570, 9, 579; 525/480, 390, 540
  See application file for complete search history.

(56) References Cited

U.S. PATENT DOCUMENTS

| 4,115,283 A | 9/1978 | Needham .................... 252/12.4 |
| 4,196,013 A | 4/1980 | Dannenberg et al. ... 106/281 R |
| 4,466,932 A | 8/1984 | Koyama et al. ........... 264/29.3 |
| 4,699,573 A | 10/1987 | Petrie et al. ................. 417/370 |
| 4,877,813 A | 10/1989 | Jinno et al. .................. 525/146 |
| 4,960,827 A | 10/1990 | Miyazaki et al. ........... 525/131 |
| 5,026,762 A * | 6/1991 | Kida et al. ................... 524/495 |
| 5,236,784 A | 8/1993 | Kobayashi et al. ......... 428/408 |
| 5,304,422 A | 4/1994 | Tanabe et al. .............. 428/392 |
| 5,346,737 A | 9/1994 | Takahashi et al. ......... 428/36.9 |
| 5,357,163 A | 10/1994 | Minakuchi et al. .......... 310/90 |
| 5,360,633 A | 11/1994 | Dean ........................ 427/220 |
| 5,432,213 A | 7/1995 | Kim et al. ..................... 524/41 |
| 5,432,224 A * | 7/1995 | Ryuhgoh et al. ........... 524/439 |
| 5,549,394 A | 8/1996 | Nowak et al. .............. 384/282 |
| 5,591,279 A * | 1/1997 | Midorikawa et al. ..... 152/209.4 |
| 5,641,275 A | 6/1997 | Klein et al. ................. 417/420 |
| 5,697,709 A | 12/1997 | Mori et al. .................. 384/297 |
| 5,730,916 A | 3/1998 | Künzel et al. ............. 264/29.4 |
| 5,762,699 A | 6/1998 | McGovern .................. 106/279 |
| 5,879,791 A | 3/1999 | Kato et al. ................. 428/295.1 |
| 5,916,499 A * | 6/1999 | Murayama et al. ......... 264/29.1 |
| 6,033,118 A | 3/2000 | Asai et al. .................. 384/115 |
| 6,095,770 A | 8/2000 | Obata et al. ................. 417/420 |
| 6,109,887 A | 8/2000 | Takura et al. ............... 417/348 |
| 6,193,793 B1 | 2/2001 | Long et al. ............ 106/284.05 |
| 6,196,722 B1 | 3/2001 | Asada et al. ................ 384/107 |
| 6,211,592 B1 | 4/2001 | Ichiyama ..................... 310/90 |
| 6,342,088 B1 | 1/2002 | Klatt et al. .................... 75/300 |
| 6,395,677 B1 * | 5/2002 | Hokkirigawa et al. ...... 502/402 |
| 6,404,087 B1 | 6/2002 | Ichiyama ..................... 310/90 |
| 6,448,307 B1 | 9/2002 | Medoff et al. .............. 523/129 |
| 6,456,458 B1 | 9/2002 | Ichiyama ................. 360/99.08 |
| 6,472,042 B1 | 10/2002 | Dibbern et al. ............... 428/95 |
| 6,494,928 B1 * | 12/2002 | Hokkirigawa et al. ......... 51/303 |
| 6,513,979 B1 | 2/2003 | Mori et al. .................. 384/107 |
| 6,550,508 B1 * | 4/2003 | Yamaguchi et al. ......... 152/167 |
| 6,573,215 B1 * | 6/2003 | Hokkirigawa et al. ...... 502/402 |
| 6,582,130 B1 | 6/2003 | Yokouchi et al. ........... 384/492 |
| 6,685,356 B1 | 2/2004 | Hirata ........................ 384/100 |
| 6,712,517 B1 | 3/2004 | Hokkirigawa et al. ...... 384/279 |
| 6,777,360 B1 * | 8/2004 | Hokkirigawa et al. ......... 501/87 |
| 6,787,075 B1 * | 9/2004 | Hokkirigawa et al. ..... 264/29.4 |
| 2002/0111388 A1 | 8/2002 | Hokkirigawa et al. ..... 521/84.1 |
| 2002/0114548 A1 * | 8/2002 | Hokkirigawa et al. ...... 384/297 |
| 2002/0114549 A1 * | 8/2002 | Hokkirigawa et al. ...... 384/297 |
| 2002/0152644 A1 * | 10/2002 | Hokkirigawa et al. ........ 36/134 |
| 2002/0152694 A1 * | 10/2002 | Hokkirigawa et al. ....... 52/79.9 |
| 2002/0152697 A1 * | 10/2002 | Hokkirigawa et al. ..... 52/173.1 |
| 2002/0158529 A1 | 10/2002 | Liu et al. ................... 310/90.5 |
| 2002/0174771 A1 * | 11/2002 | Hokkirigawa et al. ........ 96/108 |
| 2002/0175118 A1 * | 11/2002 | Hokkirigawa et al. ...... 210/266 |
| 2002/0274605 | 11/2002 | Hokkirigawa et al. ........ 51/303 |
| 2002/0192469 A1 * | 12/2002 | Hokkirigawa et al. ...... 428/402 |

(Continued)

FOREIGN PATENT DOCUMENTS

CN   1301892 A   5/1992

(Continued)

OTHER PUBLICATIONS

JP 10-219031 (abstract and translation in English).*

(Continued)

Primary Examiner—David W. Wu
Assistant Examiner—Rip A. Lee
(74) Attorney, Agent, or Firm—Ostrolenk, Faber, Gerb & Soffen, LLP

(57) ABSTRACT

A synthetic resin composition includes at least one synthetic resin and RBC or CRBC particles dispersed in the resin. A method for preparing a synthetic resin composition includes mixing RBC or CRBC particles with a synthetic resin at a temperature near the melting temperature of the synthetic resin. Preferably, the method of includes the step of kneading the mixture.

65 Claims, No Drawings

U.S. PATENT DOCUMENTS

| | | |
|---|---|---|
| 2003/0048577 A1 | 3/2003 | Kayama et al. .......... 360/99.08 |
| 2003/0134104 A1* | 7/2003 | Hokkirigawa et al. ... 428/317.9 |
| 2003/0183973 A1* | 10/2003 | Hokkirigawa et al. ...... 264/109 |
| 2003/0220421 A1* | 11/2003 | Hokkirigawa et al. ......... 524/9 |
| 2004/0013333 A1 | 1/2004 | Hokkirigawa et al. ...... 384/297 |
| 2004/0132881 A1 | 7/2004 | Okamiya et al. ........... 524/284 |
| 2004/0165797 A1 | 8/2004 | Oku et al. .................. 384/119 |

FOREIGN PATENT DOCUMENTS

| | | | |
|---|---|---|---|
| JP | 10-219031 A | * | 8/1998 |
| JP | 2000-266052 | | 9/2000 |
| JP | 2001-2742 | | 1/2001 |
| JP | 2001-89273 A | * | 4/2001 |
| JP | 2000-121861 | | 10/2001 |

OTHER PUBLICATIONS

Kazuo Hokkirigawa, Kino Zairyo "Functional Materials", vol. No. 5, pp. 24-28, (May 1997).

Official Publication of Toku Kai Hei 5-32797.

Official Publication of Toku Kai Hei 7-268126.

* cited by examiner

LOW-FRICTION, HIGH-DISPERSION SYNTHETIC RESIN COMPOSITION CONTAINING FINE PARTICLES OF RB CERAMIC OR CRB CERAMIC AND A METHOD FOR ITS PREPARATION

BACKGROUND OF THE INVENTION

1. Field of the Invention

The invention relates to synthetic resin compositions, and more particularly to synthetic resin compositions having various additives evenly dispersed therein and a method for preparing the compositions.

2. Description of the Related Art

In the past, various fillers such as a stabilizer, a coloring agent, an anti-static agent, an ultra-violet ray absorbent, lubricant, a flame retarder, and other constitutional fillers have been added to synthetic resin compositions. Fine particles of carbon block have also been added to synthetic resin compositions to create electrical conductivity. However, it has been difficult to evenly disperse such materials due to the differences in their polarities, solubilities and specific gravities. It has also been difficult to obtain a stable electrically conductive synthetic resin composition.

It is also known that ceramics can be made from rice bran (known as "RB") and/or carbonized rice bran (known as "CRB") to form porous carbon materials. The defatted rice bran used for these materials is impregnated with thermosetting resins such as a phenol resin and carbonized in a nitrogen gas environment. During the carbonizing process, the rice bran changes to soft amorphous carbon and the phenol resin changes to hard glassy carbon. The resulting material is a porous composite structure.

The rice processing industry seeks commercial uses for RB and/or CRB. There is a need for this because rice bran is a waste product that needs to be disposed of.

SUMMARY OF THE INVENTION

The present invention relates to a synthetic resin composition comprising at least one synthetic resin and at least one type of particles selected from the group consisting of RB ceramic (referred to hereinafter as "RBC") and CRB ceramic (referred to hereinafter as "CRBC").

In a preferred embodiment, the invention provides a method for the preparation of a synthetic resin composition comprising: a) mixing at least one type of particles selected from the group consisting of RBC and CRBC with at least one constitutional filler or additive to form mixture 1; b) adding mixture 1 to a synthetic resin at a temperature near the melting temperature of the synthetic resin to form mixture 2; and c) kneading mixture 2.

In a preferred embodiment, the invention provides a method of lowering the friction coefficient of a synthetic resin composition by adding to the composition at least one type of particles selected from the group consisting of RBC and CRBC.

In a preferred embodiment, the invention provides a method of improving the dispersion of an additive in a synthetic resin composition by adding to the composition at least one type of particles selected from the group consisting of RBC and CRBC.

In a preferred embodiment, the invention provides a method of increasing the electrical conductivity of a synthetic resin composition by adding to the composition at least one type of particles selected from the group consisting of RBC and CRBC.

Other features and advantages of the present invention will become apparent from the following description of the preferred embodiments.

DESCRIPTION OF THE PREFERRED EMBODIMENTS

RBC and CRBC are used in the preferred embodiments of the invention. The RBC and CRBC are advantageous because they possess the following qualities:

1. they are very hard;
2. when they are made into grains, their shape is irregular;
3. their expansion coefficient is extremely small;
4. they are electrically conductive;
5. their specific gravity is low and they are light and porous;
6. their friction coefficient is extremely small; and
7. their resistance to friction is superior.

Moreover, because the materials are based on rice bran, there is no adverse effect upon the earth's environment and they serve to preserve natural resources.

To produce RBC or CRBC, rice bran is preferably used as a starting material because of its low cost. Large quantities are produced as a by-product of other processes, e.g., about 900,000 tons per year in Japan alone and 33,000,000 tons per year throughout the world.

RBC is a carbon material made, for example, by mixing and kneading a de-fatted rice bran (de-fatted bran obtained from rice) with a thermally hardening or thermosetting resin, molding a product from the mixture, drying it, and then firing the dried molded product in an inert gas atmosphere, e.g., sintering. See Kazuo Hokkirigawa, Kino Zairyo "Functional Materials", Vol. 17, No. 5, pp. 24–28 (May 1997).

Preferably, the thermosetting resin can be any resin, provided that it can be thermally hardened or heat cured. Examples of thermosetting resins include, but are not limited to, phenolic resins, diaryl phthalate resins, unsaturated polyester resins, epoxy resins, polyimide resins, and triazine resins. Phenolic resins, e.g., resols, are preferable.

Preferably, the mass ratio of the mixture between the defatted bran and the thermosetting resin is from about 50 to 90:50 to 10 by weight, and desirably about 75:25. Stated another way, the mass ratio of the mixture between defatted bran and the thermosetting resin is from about 1/1 to about 9/1, more preferably from about 9/5 to about 5/1, and most preferably about 3/1.

After the defatted bran and the resin are mixed, the product is molded by any of the known methods, and then dried. The molded product is then fired at a temperature between 700 and 1000° C., e.g., sintered. Ordinarily a rotary kiln is used and the firing time is approximately 40 to 120 minutes.

The CRBC is a carbon material which is an improvement over the RBC and is also obtained from defatted rice bran and a thermosetting resin. CRBC resins are either black resins or porous ceramics made, for example, as set forth below.

The defatted rice bran and the thermosetting resin are mixed and kneaded, and then fired in an inert gas at a temperature between 700 and 1000° C., e.g., sintered. The mixture is then pulverized (crushed) at less than 100 mesh to obtain carbonized powder. The carbonized powder and the thermosetting resin are mixed and kneaded. After molding the mixture under pressure in the range between 20 MPa and 30 MPa, the molded product is once again fired in an inert gas atmosphere at a temperature between 500 and 1100° C., e.g., sintering.

The RBC and/or CRBC have a bulk specific gravity in a range between 1.22 and 1.35 (g·cm$^{-3}$). (Bulk specific gravity being measured according to the bulk specific gravity measuring method described in JIS R 7222.7 by using the test pieces as described in JIS R 1601.4. RB ceramics and/or CRB ceramics are porous, with a result that their bulk specific gravity alone can be measured.) In accordance with the present invention, it has been found that, a low-friction and high-dispersion synthetic resin composition can be obtained by dispersing finely pulverized RBC and/or CRBC in a resin. Preferably, the RBC or CRBC is pulverized into particles having a mean particle size of about 300 µm or less, and more preferably, from about 10 to about 100 µm, and particularly preferably, from about 10 to about 50 µm.

Preferably, the mass ratio between the fine particles of RBC or CRBC and the synthetic resins should be from about 5 to 90:95 to 10, or about 5/95 to about 9/1. For example, the RBC or CRBC should constitute about 5 to 90% by weight of the entire synthetic resin composition. It has been found that when the addition of the synthetic resin exceeds 95 mass percent, the low-friction and high-dispersion characteristics will deteriorate. When it is less than 10%, the composition becomes difficult to form.

Preferably, the RBC and CRBC materials are mixed with a synthetic resin to obtain the synthetic resin composition of the present invention. Examples of the synthetic resins that can be used in the present invention include, but are not limited to, thermally cured plastic or thermoplastic resins such as polyamide, polyester and polyolefin, and the like. To be specific, such thermoplastic resins include, but are not limited to, nylon 66 (polyhexamethylene adipoamide), nylon 6 (polycapramide), nylon 11 (polyundecaneamide), nylon 12, polyacetal, polybutylene terephthalate, polyethylene terephthalate, polypropylene, polyethylene, polyphenylene sulfide, and the like. Nylon 66, is particurlarly desirable. These thermoplastic resins can be used either individually or in combinations of two or more.

A thermosetting resin can also be used. As explained above, examples of thermosetting resins include, but are not limited to, phenolic resins, diaryl phthalate resins, unsaturated polyester resins, epoxy resins, polyimide resins, triazine resins, and the like. Preferably, one or more of the thermosetting resins should not constitute more than about 20 weight percent of the resin component of the synthetic resin composition of the present invention, provided that there is no problem in terms of the resins mutual solubility.

In a preferred embodiment, the resin composition of the present invention includes at least one constitutional filler or at least one additive selected from the group consisting of a stabilizer, an oxidation preventive agent, a colorant, an anti-static agent, an ultra-violet ray absorbent, a lubricant, and a flame retarder.

Additives cannot normally be satisfactorily dispersed in the resins. High-dispersion is achieved in the resin composition of the present invention because the presence of the fine particles of RBC and/or CRBC allows the stabilizer, oxidation preventive agent, coloring agent, anti-static agent, ultra-violet ray absorption agent, lubricant, flame retarder and other constitutional fillers to be evenly dispersed.

As indicated hereinbelow, an extensive study was carried out, with an eye towards the particular characteristics of RBC and CRBC. A surprising result indicated that, even when the stabilizer, oxidation preventive agent, coloring agent, anti-static agent, ultra-violet ray absorption agent, lubricant, flame retarder and other constitutional fillers have an affinity with water or oil, RBC and/or CRBC has a capacity (high-dispersion capacity) to be evenly dispersed in the synthetic resin.

Without being bound by theory, it is believed that the reason for this surprising result is that the RBC and CRBC are porous carbon substances possessing inorganic material such as phosphorous (P), potassium (K) etc.

Furthermore, it has been found that the synthetic resin compositions of the present invention with the addition of the fine particles of RBC and/or CRBC have a lower friction coefficient as compared with the same synthetic resin compositions without such additions. It has also been found that a resin product with low-friction surface characteristics can be made by molding a synthetic resin composition including fine particles of RBC or CRBC.

In a preferred embodiment, the typical method of producing a low-friction, high-dispersion synthetic resin composition according to the present invention includes mixing the fine particles of RBC or CRBC and optionally at least one additive selected from the group consisting of a stabilizer, oxidation preventive agent, coloring agent, anti-static agent, ultra-violet ray absorbent agent, lubricant, flame retarder and other constitutional fillers. The mixture is then added to the synthetic resin at a temperature near the melting point of the resin, e.g., within about 10° C., and kneading the same. As a result, the fine particles of RBC or CRBC and the additives are evenly dispersed.

Preferably, the fine particles of RBC or CRBC to be used in the present invention should have an average grain diameter or mean particle size of about 300 µm or less. A mean particle size between about 10 and about 100 µm is more desirable. A mean particle size between about 10 and about 50 µm is particularly desirable to form low-friction, high-dispersion synthetic resin compositions.

The preferred stabilizers to be used in the present invention include, but are not limited to, thermal stabilizers like phosphoric acid ester and phosphorous acid ester, hindered amine optical stabilizers, phenyl benzoate optical stabilizer and nickel complex salt.

Specific examples of the above-identified hindered amine or phenyl benzoate optical stabilizers include, but are not limited to, bis (2,2,6,6-tetramethyl-4-piperidyl) sepacate, condensates of succinic acid and N-(2-hydroxypropyl)-2,2, 6,6-tetramethyl-4-hydropiperidine, 1,2,3,4-butane tetracarboxylate, polycondensates of N, N'-bis (2,2,6,6-tetramethyl-4-piperidyl) hexamethylene diamine and 1,2-dibromoethane, bis (2,2,6,6-tetramethylpiperidyl) adipate, bis (2,2,6,6-tetramethyl piperidyl) adipate, bis (2,2,6,6-tetramethyl piperidyl) fumarate, poly [[6-(1,1,3,3-tetramethyl butyl) imino-1,3,5-triazine-2,4-diil] [(2,2,6,6-tetramethyl-4-piperidyl) imino] hexamethylene [(2,2,6,6-tetramethyl-4-piperidyl) imino]], 2,4-di-t-butyl phenyl-3,5-di-t-butyl-4-hydroxybenzoate, 4-octylphenyl-3,5-di-t-butyl-4-hydroxybenzoate, n-hexadecyl, and 3,5-di-t-butyl-4-hydroxy benzoate, and the like.

The preferred oxidation preventive agents that can be used in the present invention are those of the phenolic system, the phosphoric system, and the sulfur system. Examples of the phenolic oxidation preventive agents include, but are not limited to, 2,6-di-t-butyl-4-methylphenol, tris(3,5-di-t-butyl-4-hydroxybenzyl) isocyanurate, tetra [methylene-3-(3,5-di-t-butyl-4-hyroxyphenyl) propionate] methane, n-octadecyl-3-(3'-5'-di-t-butyl-4'-hydroxyphenyl) propionate, 4,4'butylydene bis-(3-methyl-6-t-butylphenol, triethylene glycol-bis[3-(3-t-butyl-4-hydroxy-5-methylphenyl) propionate], and 3,9-bis[2-[3(3-t-butyl-4-hydroxy-5- methyl phenyl) propionyloxy]-1,1-dimethylethyl]-2,4,8,10-tetraoxaspiro [5,5] undecane, and the like.

Examples of the oxidation preventive agents of the phosphorus system include, but are not limited to, trisnonyl phenyl phosphite, di-stearylpentaerythritol diphosphite, tris (2,4-di-t-butyl phenyl) phosphite, tetra(2,4-di-t-butylphenyl)-4,4'-biphenylene-diphosphonite, bis (2,4-di-t-butyl phenyl) pentacrithritol diphosphite, bis (2,6-t-butyl-4-methyl phenyl) pentaerythritol diphosphite, and 2,2,-methylene bis (4,6-di-t-butylphenyl) octyl phosphite, and the like.

Examples of the oxidation preventive agents of the sulfur system include, but are not limited to, dilauryl-3-3'-thiodipropionate, dimyristyl-3-3'-thiodipropionate, distearyl-3,3'-thio dipropionate, and pentaerythritol tetra(3-lauryl thiopropionate), and the like.

The low-friction and high-dispersion synthetic resin composition of the present invention is usually black in color. Preferably, a coloring agent is used to give depth to this black color. Dyes and pigments can be used as the coloring agents, but pigments are preferable.

Examples of white pigments include, but are not limited to, titanium oxide, zinc white, white lead and lithopone, and the like. Examples of black pigments include, but are not limited to, aniline black, black iron, and carbon black, and the like. Examples of yellow pigments include, but are not limited to, chrome yellow, yellow iron oxide, titanium yellow, Hansa yellow, benzine yellow and permanent yellow, and the like. Examples of orange pigments include, but are not limited to, chrome vermilion, permanent orange and Balkan first orange, and the like. Examples of brown pigments include, but are not limited to, iron oxide, permanent brown and paragraph-brown, and the like. Examples of red pigments include, but are not limited to, red oxide, cadmium red, antimony red, permanent red, arizalin lake, thio indigo red, PV carmine and mono-light first red, and the like. Examples of purple pigments include, but are not limited to, cobalt purple, manganese purple, first violet and methyl violet lake, and the like. Examples of blue pigments include, but are not limited to, dark blue, cobalt blue, peacock blue lake, Victoria blue lake, non-metal phthalocyanine blue and indigo, and the like. Examples of green pigments include, but are not limited to, chrome green, chromium oxide, emerald green, green gold, acid green lake, marachite green lake, and phthalocyanine green, and the like. Furthermore, other metal powder pigments can also be used.

The ultra-violet ray absorption agents that are used in the compositions of the present invention include, but are not limited to, benzotriazole compounds, benzophenon compounds, salicylate compounds, cyanoacrylate compounds, benzoate compounds, oxalic compounds, and hindered amine compounds, and nickel complex salts, and the like.

The lubricants that can be used in the present invention include, but are not limited to, talc, magnesium carbonate, calcium carbonate, and kaolin.

The flame retarders that can be used in the compositions of the present invention include, but are not limited to, tetrabromobisphenol A derivatives, hexabromodiphenylether and tetrabromo phthalic anhydride and other halogen-containing compounds, triphenylphosphate, triphenyl phosphite, red phosphorus and poly ammonium phosphate and other phosporus-containing compounds, urea and guanidine and other nitrogen-containing compounds, silicone oil, organic silane, aluminum silicate and other silicon-containing compounds, antimony trioxide, and antimony phosphate, and other antimony-containing compounds.

Other constitutional fillers that can be used in the present invention include, but are not limited to, glass flakes, glass beads, silica, quartz, amorphous silicic acid, alumina, metal powder, calcium silicate, and mica, tabular spar, etc.

It has also been found that the synthetic resin composition of the present invention is electrically conductive. In particular, it has been found that the low-friction and high-dispersion synthetic resin compositions of the present invention will become more electrically conductive as the content of the RBC and/or CRBC fine particles is increased.

The desired electrical conductivity of the composition of the present invention can be varied based on the ratio between the fine particles of RBC or CRBC and the synthetic resin. Preferably, the mass ratio for electrical conductivity between the fine particles of RBC or CRBC and the synthetic resin should be about 20 to 90:80 to 10 or about 1/4 to about 9/1. More preferably, the mass ratio should be about 35 to 90:65 to 10.

It has been found that if the synthetic resin exceeds 80 mass percent, the electrical conductivity of the composition deteriorates. When it is less than 10 mass percent, the composition becomes difficult to form.

In a preferred embodiment, in order to increase electrical conduction or conductivity of the composition of the present invention, electrically conductive filling materials with a small electric resistance such as carbon black, graphite, carbon fibers, metal fibers, and metal particles can also be used.

The low-friction, high-dispersion synthetic resin compound of the present invention can be formed by any of the known methods. For example, the compound may be made into the shape of pellets formed by an extruder, an injector, a roll mill, and the like.

Preferably, the temperature of the metal mold is set on a low level. Basically, the temperature is set in the range from about the glass transition point to about the fusion point of the synthetic resin. Moreover, it is preferable that the metal mold be slowly cooled rather than suddenly cooled to obtain a product with satisfactory friction characteristics.

The advantages and important features of the present invention will become more apparent from the following examples.

EXAMPLE 1

Preparation of RBC Fine Particles

A quantity of 750 grams of defatted bran obtained from rice bran and 250 grams of liquid phenolic resin (resol) were mixed and kneaded while being heated to a temperature in the range between 50 and 60° C. A plastic homogeneous mixture was obtained.

The mixture was baked in a nitrogen atmosphere at a temperature of 900° C. in a rotary kiln for a period of 100 minutes. The resulting carbide product was crushed using a pulverizer. A 150-mesh sieve was used to obtain RBC particles, i.e., a powder, with a mean particle size in the range between 140 and 160 μm.

Preparation of a Mixture of RBC Particles and the Synthetic Resin

A quantity of 500 grams of the RBC particles and 500 grams of nylon 66 powder were mixed and kneaded while being heated in the range between 240 and 290° C. A plastic homogeneous mixture was obtained. The content of the RBC particles was 50% by weight.

Preparation of Test Pieces

Test pieces were prepared by injection molding the plastic mixture.

EXAMPLE 2

Fine particles of RBC having a mean particle size between 140 and 160 μm were made by using the method of Example 1.

Preparation of a Mixture of RBC Particles and Synthetic Resin

A quantity of 700 grams of RBC fine particles and 300 grams of nylon 66 powder were mixed and kneaded while being heated to a temperature in the range between 240 and 290° C. A plastic homogeneous mixture was obtained. The content of the RBC particles was 70% by weight.

Preparation of the Test Pieces

Test pieces were prepared by injection molding the plastic mixture.

EXAMPLE 3

Preparation of Fine Particles of RBC

A quantity of 750 grams of defatted bran obtained from rice bran and 250 grams of liquid phenolic resin (resol) were mixed and kneaded while being heated to a temperature in the range between 50 and 60° C. A plastic homogeneous mixture was obtained.

The mixture was baked at a temperature of 1000° C. in a nitrogen atmosphere by using a rotary kiln for a period of 100 minutes. The resulting carbon product was pulverized (crushed) in a pulverizer. It was then sifted by using a 400-mesh sieve. Fine RBC particles, i.e., a powder, with a mean particle size in the range of 40 to 50 μm were obtained.

Preparation of a Mixture of Fine Particles of RBC and Synthetic Resin

A quantity of 700 grams of the fine particles of RBC and 300 grams of nylon 66 powder were mixed and kneaded while being heated to a temperature in the range between 240 and 290° C. A plastic homogenous mixture was obtained. The content of the fine particles of RBC was 70% by weight.

Preparation of the Test Pieces

Test pieces were prepared by injection molding the plastic mixture.

EXAMPLE 4

Preparation of Fine CRBC Particles

A quantity of 750 grams of defatted bran obtained from rice bran and 250 grams of phenolic resin (resol) were mixed and kneaded while being heated to a temperature in the range between 50 and 60° C. A plastic homogeneous mixture was obtained.

The mixture was fired at a temperature of 900° C. in a nitrogen atmosphere by using a rotary kiln for a period of 60 minutes. The resulting carbide product was crushed by a pulverizer. It was then sifted by using a 200-mesh sieve. As a result, fine RBC particles with a mean particle diameter in the range between 100 and 120 μm were obtained.

A quantity of 750 grams of the fine RBC particles and 500 grams of solid phenolic resin (resol) were mixed and kneaded while being heated to a temperature in the range between 100 and 150° C. A plastic homogenous mixture was obtained.

Next, the plastic mixture was pressure-formed under a pressure of 22 MPa into a globe having about a 1 cm diameter. The temperature of the metal mold was 150° C.

The molded product was removed from the metal mold and heated in a nitrogen atmosphere. The temperature was elevated at a rate of 1° C. per minute until 500° C. was reached and held for a period of 60 minutes. The product was heated at a temperature of 900° C. for a period of approximately 120 minutes.

Next, the temperature was lowered at the rate of 2–3° C. per minute until 500° C. was reached. Thereafter, the temperature was not further manipulated.

The resulting CRBC product was crushed with a pulverizer. Fine CRBC particles, i.e., a powder, with a mean particle size in the range between 20 and 30 μm were obtained by using a 500-mesh sieve.

Preparation of a Mixture of CRBC Fine Particles and Synthetic Resin

A quantity of 500 grams of the fine CRBC particles and 500 grams of the powder of nylon 66 were mixed and kneaded while being heated to a temperature in the range between 240 and 290° C. A plastic homogenous mixture was obtained. The content of the CRBC fine particles was 50% by weight.

Preparation of the Test Pieces

Test pieces were prepared by injection molding the plastic mixture.

EXAMPLES 5–10 AND COMPARATIVE EXAMPLES 1 AND 2

As per Examples 1 to 4, test pieces of Examples 5–10 were prepared using fine RBC or CRBC particles or powder and 2,6-di-t-butyl-4-methylphenol as an oxidation preventive agent, marachite green lake as a pigment, and tetrabromobisphenol, a derivative as a flame retarder. See Table 1.

In addition, a comparative test piece 1 (comparative Example 1) was prepared by using fine particles (whose mean particle diameter was 30 μm) of activated charcoal purchased on the market as a substitute for the fine particles of RBC or CRBC. A comparative test piece 2 (comparative Example 2) was also prepared without adding the fine RBC and CRBC particles or the activated charcoal particles purchased on the market.

TABLE 1

|  | Ex. 5 | Ex. 6 | Ex. 7 | Ex. 8 | Ex. 9 | Ex. 10 | Comparative Ex. 1 | Comparative Ex. 2 |
|---|---|---|---|---|---|---|---|---|
| Type of Fine Particles | CRBC (see Ex. 4) | RBC (see Ex. 3) | RBC (see Ex. 1) | RBC (see Ex. 2) | RBC (see Ex. 2) | CRBC (see Ex. 4) | Activated Charcoal | None |
| Synthetic Resin | Nylon 66 | PBT | PP | PPS | Nylon 66 | Nylon 6 | PPS | PPS |
| Fine Particles: | 70:30 | 50:50 | 70:30 | 50:50 | 30:70 | 20:80 | 50:50 | 0:100 |

TABLE 1-continued

|  | Ex. 5 | Ex. 6 | Ex. 7 | Ex. 8 | Ex. 9 | Ex. 10 | Comparative Ex. 1 | Comparative Ex. 2 |
| --- | --- | --- | --- | --- | --- | --- | --- | --- |
| Resin (mass ratio) |  |  |  |  |  |  |  |  |
| Oxidation Preventive Agent (mass %) | 3 | 3 | 3 | 3 | 3 | 3 | 3 | 3 |
| Pigment (mass %) | 3 | 3 | 3 | 3 | 3 | 3 | 3 | 3 |
| Flame Retarder (mass %) | 5 | 5 | 5 | 5 | 5 | 5 | 5 | 5 |

PBT: Polybutylene terephthalate
PP: Polypropylene
PPS: Polyphenylene sulfide
Oxidation Preventive Agent: 2,6-di-t-butyl-4-methylphenol
Pigment: Marachite green lake
Fire Retarder: Tetrabromobisphenol A derivative Certain characteristics of the low-friction and high-dispersion resin composition as obtained in Examples 1 to 10 are summarized in Table 2. The friction coefficient was measured under a load of 50 grams using a steel ball with a diameter of 2 mm in a torque type friction resistance gauge (Pinon Disk). The measurement was carried out at a sliding speed of 0.1 meter per second in a dry state. The dispersion was based on an eye test.

TABLE 2

|  | Tensile Strength (MPa) | Bending Strength (MPa) | Bending Modulus of Elasticity (GPa) | Specific Resistance Ωcm | Specific Gravity | Coefficient of Friction μ | Dispersion |
| --- | --- | --- | --- | --- | --- | --- | --- |
| Example 1 | 64.6 | 98.6 | 6.12 | 4.9E + 01 | 1.35 | 0.20 | ⊚ |
| Example 2 | 61.4 | 97.6 | 6.14 | 3.2E + 01 | 1.38 | 0.21 | ⊚ |
| Example 3 | 76.5 | 120 | 8.85 | 2.1E + 01 | 1.43 | 0.24 | ⊚ |
| Example 4 | 75.9 | 117 | 8.56 | 3.4E + 01 | 1.38 | 0.23 | ⊚ |
| Example 5 | 57.3 | 105 | 4.12 | 3.3E + 01 | 1.27 | 0.22 | ⊚ |
| Example 6 | 49.6 | 72.3 | 7.5 | 3.3E + 01 | 1.46 | 0.25 | ⊚ |
| Example 7 | 22.7 | 44.3 | 6.5 | 3.8E + 01 | 1.32 | 0.22 | ⊚ |
| Example 8 | 79.2 | 121 | 7.6 | 4.0E + 01 | 1.48 | 0.23 | ⊚ |
| Example 9 | 57.3 | 101 | 4.3 | 2.7E + 01 | 1.24 | 0.24 | ○ |
| Example 10 | 72.3 | 109 | 4.3 | 2.4E + 08 | 1.20 | — | ○~Δ |
| Comparative Example 1 | 64.4 | 96.7 | 7.6 | 3.6E + 01 | 1.44 | 0.33 | Δ |
| Comparative Example 2 | 159 | 235 | 14.1 | 1.0E + 16 | 1.75 | 0.35 | X |

Dispersion: ⊚: Excellent Δ: Passing ○: Good X: Bleeding

As is clear from the results shown in Table 2, the low-friction, high-dispersion synthetic resin composition consisting of fine particles of RBC or CRBC of the present invention has superior dispersion characteristics in terms of the additives. It has also been found that, if the content of the fine particles of RBC and CRBC is increased, the product will be useful as a resin composition having increased electrical conductivity.

Although the present invention has been described in relation to particular embodiments thereof, many other variations and modifications and other uses will become apparent to those skilled in the art. The present invention, therefore, is not limited by the specific disclosure herein.

What is claimed is:

1. A resin composition, comprising:
   at least one resin and at least one selected from the group consisting of Rice Bran Ceramic (RBC) and Carbonized Rice Bran Ceramic (CRBC) dispersed in the resin, wherein the mass ratio between the at least one of RBC and CRBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

2. The resin composition of claim 1, wherein the at least one of RBC and CRBC are formed from a mass ratio of mixture between a defatted bran and a thermosetting resin of about 50:50 to 90:10.

3. The resin composition of claim 2, wherein the mass ratio is about 75:25.

4. The resin composition of claim 1, wherein the composition includes about 5% by weight of the at least one of RBC and CRBC.

5. The resin composition of claim 1, wherein the composition includes about 20% by weight of the at least one of RBC and CRBC.

6. The resin composition of claim 1, wherein the composition is electrically conductive.

7. The resin composition of claim 1, wherein the composition includes electrically conductive filling materials.

8. The resin composition of claim 1, wherein the thermoplastic resin is selected from the group consisting of at least one of: nylon 66 (polyhexamethylene adipoamide), nylon 6 (polycapramide), nylon 11 (polyundecaneamide), nylon 12, polyacetal, polybutylene terephthalate, polyethylene terephthalate, polypropylene, polyethylene, and polyphenylene sulfide.

9. The resin composition of claim 1, wherein the thermosetting resin is selected from the group consisting of at least one of: phenolic resin, diaryl phthalate resin, unsaturated polyester resin, epoxy resin, polyimide resin, and triazine resin.

10. The resin composition of claim 1, wherein the at least one of RBC and CRBC are particles having a mean particle size of about 300 μm or less.

11. The resin composition of claim 10, wherein the mean particle size is about 10 to 100 μm.

12. The resin composition of claim 11, wherein the mean particle size is about 10 to 50 μm.

13. The resin composition of claim 1, further comprising at least one constitutional filler.

14. The resin composition of claim 13, wherein the constitutional filler is at least one selected from the group consisting of: glass flakes, glass beads, silica, quartz, amorphous silica acid, alumina, metal powder, calcium silicate, and mica.

15. The resin composition of claim 13, wherein the filler and the at least one of RBC and CRBC is uniformly dispersed in the resin.

16. The resin composition of claim 1, further comprising at least one additive selected from the group consisting of: a stabilizer, an oxidation preventive agent, a colorant, an anti-static agent, an ultra-violet ray absorbent, a lubricant, and a flame retarder.

17. The resin composition of claim 16, wherein the additive and the at least one of RBC and CRBC are uniformly dispersed in the resin.

18. The resin composition of claim 1, wherein the at least one of RBC and CRBC is uniformly dispersed in the composition.

19. The resin composition of claim 18, further including electrically conductive filling materials.

20. The resin composition of claim 1, wherein the at least one of RBC and CRBC is uniformly dispersed in the resin.

21. A resin composition according to claim 1, wherein the at least one of RBC and CRBC is more than 20% and less than or equal to 30% of the weight of the resin.

22. A resin composition, comprising:
at least one resin and at least one selected from the group consisting of Rice Bran Ceramic (RBC) and Carbonized Rice Bran Ceramic (CRBC) dispersed in the resin, wherein the mass ratio between the at least one of RBC and CRBC and resin is less than or equal to 30:70, and wherein the composition is electrically conductive, wherein the resin includes at least one thermoplastic resin selected from the group consisting of polyamide, polyester and polyolefin resin and wherein the resin further includes a thermosetting resin that constitutes about 20% by weight or less of the resin.

23. A low friction resin composition, comprising:
at least one resin and at least one selected from the group consisting of Rice Bran Ceramic (RBC) and Carbonized Rice Bran Ceramic (CRBC) substantially uniformly dispersed in the resin, wherein the mass ratio of the RBC and CRBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

24. A resin composition, comprising:
at least one resin and Rice Bran Ceramic (RBC) and Carbonized Rice Bran Ceramic (CRBC) dispersed in the resin, wherein the mass ratio between the RBC and CRBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

25. A resin composition, comprising:
at least one resin and Carbonized Rice Bran Ceramic (CRBC) dispersed in the resins wherein the mass ratio between the CRBC and the resin is less than or equal to 39:70, wherein the resin includes at least one thermoplastic resin selected from the group consisting of polyamide, polyester and polyolefin resin and wherein the resin further includes a thermosetting resin that constitutes about 20% by weight or less of the resin.

26. A resin composition, comprising:
at least one resin and at least one selected from the group consisting of Rice Bran Ceramic (RBC) and Carbonized Rice Bran Ceramic (CRBC) dispersed in the resin, wherein the mass ratio between the at least one of RBC and CRBC and resin is less than or equal to 30:70, and wherein the composition includes electrically conductive filling materials, wherein the resin includes at least one thermoplastic resin selected from the group consisting of polyamide, polyester and polyolefin resin and wherein the resin further includes a thermosetting resin that constitutes about 20% by weight or less of the resin.

27. A resin composition, comprising:
at least one resin;
particles of at least one selected from the group consisting of Rice Bran Ceramic (RBC) and Carbonized Rice Bran Ceramic (CRBC);
at least one additive; and
at least one constitutional filler, wherein the particles, additive and filler are uniformly dispersed in the resin, wherein the mass ratio of the at least one of RBC and CRBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

28. The resin composition of claim 27, wherein the composition includes about 5% by weight of the at least one of RBC and CRBC.

29. A method for preparing a resin composition, comprising the step of:
mixing at least one selected from the group consisting of Rice Bran Ceramic (RBC) and Carbonized Rice Bran Ceramic (CRBC) with a resin at a temperature near the melting temperature of the resin, wherein the mass ratio between the at least one of RBC and CRBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

30. The method of claim 29, wherein the at least one of RBC and CRBC in the form of a powder is mixed with the resin.

31. The method of claim 30, wherein the powder has a mean particle size of about 300 μm or less.

32. The method of claim 29, further comprising the step of kneading the mixture.

33. The method of claim 29, wherein the mixing takes place at a temperature within about 10° C. of the melting temperature of the resin.

34. The method of claim 29, wherein the mixing takes place at a temperature between the glass transition point and the fusion point of the resin.

35. The method of claim 29, wherein the composition includes about 5% by weight of the at least one of RBC and CRBC.

36. The method of claim 29, further comprising the step of:
   adding an electrically conductive filing material.

37. A method for preparing a resin composition, comprising the steps of:
   a) mixing particles of at least one selected from the group consisting of Rice Bran Ceramic (RBC) and Carbonized Rice Bran Ceramic (CRBC) with at least one constitutional filler or additive to form mixture 1; and
   b) adding mixture 1 to a resin at a temperature near the melting temperature of the resin to form mixture 2, wherein the mass ratio of the at least one of RBC and CRBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

38. The method of claim 37, further comprising the step of:
   c) kneading mixture 2 to uniformly disperse at least one of the particles, the filler and the additive in the resin.

39. The method of claim 37, wherein the mixture 1 is added to the resin at a temperature within about 10° C. of the melting temperature of the resin to form mixture 2.

40. The method of claim 37, wherein the additive is at least one selected from the group consisting of: a stabilizer, an oxidation preventative agent, a coloring agent, an anti-static agent, an ultra-violet ray absorption agent, a lubricant, and a flame retarder; and the constitutional filler is selected from the group consisting of glass flakes, glass beads, silica, quartz, amorphous silica acid, alumina, metal powder, calcium silicate, and mica.

41. A method for lowering the friction coefficient of a resin composition, comprising the step of:
   adding to the composition at least one type of particles selected from the group consisting of Rice Bran Ceramic (RBC) and Carbonized Rice Bran Ceramic (CRBC), wherein the mass ratio between the at least one of RBC and CRBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

42. The method of claim 41, further comprising the steps of:
   a) molding the mixed composition in a mold at a temperature; and
   b) slowly cooling the mold after molding.

43. A method for improving the dispersion of an additive or filler in a resin composition, comprising the step of:
   adding to the composition at least one selected from the group consisting of Rice Bran Ceramic (RBC) and Carbonized Rice Bran Ceramic (CRBC), wherein the mass ratio between the at least one of RBC and CRBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

44. A method for increasing the electrical conductivity of a resin composition, comprising the step of:
   adding to the composition at least one selected from the group consisting of Rice Bran Ceramic (RBC) and Carbonized Rice Bran Ceramic (CRBC), wherein the mass ratio between the at least one of RBC and CRBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

45. The method of claim 44, wherein the composition includes about 20% by weight of the at least one of RBC and CRBC.

46. A composite material, comprising:
   particles of at least one selected from the group consisting of Rice Bran Ceramic (RBC) and Carbonized Rice Bran Ceramic (CRBC); and
   a resin material, wherein the particles are uniformly dispersed in the resin material, and wherein the mass ratio between the at least one of RBC and CRBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

47. The composite material of claim 46, wherein the thermosetting resin is at least one selected from the group consisting of: phenolic resins, diaryl phthalate resins, unsaturated polyester resins, epoxy resins, polyimide resins, triazine resins.

48. The composite material of claim 46, wherein the mean particle size of the particles is about 300 μm or less.

49. The composite material of claim 46, wherein the particles constitute about 5% by weight of the composite material.

50. The composite material of claim 46, further comprising at least one constitutional filler.

51. The composite material of claim 50, further comprising at least one additive.

52. The composite material of claim 51, wherein at least one of the at least one filler, and the at least one additive is uniformly dispersed in the resin material.

53. An electrically conductive composite material, comprising:
   particles of at least one selected from the group consisting of Rice Bran Ceramic (RBC) and Carbonized Rice Bran Ceramic (CRBC); and
   a resin material, wherein the particles are dispersed in the resin material, and constitute 30% or less by weight of the composite material, wherein the resin includes at least one thermoplastic resin selected from the group consisting of polyamide, polyester and polyolefin resin and wherein the resin further includes a thermosetting resin that constitutes about 20% by weight or less of the resin.

54. The electrically conductive composite material of claim 53, wherein the particles are uniformly dispersed in the resin material.

55. The electrically conductive composite material of claim 53, further comprising electrically conductive filling material.

56. The electrically conductive composite material of claim 55, wherein the electrically conductive filling material includes at least one selected from the group consisting of: carbon black, graphite, carbon fibers, metal fibers, and metal particles.

57. The electrically conductive composite material according to claim 53, wherein the particles are fine particles.

58. A method for preparing a composite material, comprising the steps of:
   a) providing fine particles of at least one selected from the group consisting of Rice Bran Ceramic (RBC) and Carbonized Rice Bran Ceramic (CRBC);
   b) providing at least one polymer-based matrix material;
   c) mixing the polymer-based matrix material and the fine particles such that the mass ratio between the at least one of RBC and CRBC is less than or equal to 30:70;
   d) melting the polymer-based matrix material; and
   e) solidifying the molten mixture of the fine particles and the polymer-based matrix material, wherein the resin includes at least one thermoplastic resin selected from the group consisting of polyamide, polyester and polyolefin resin and wherein the resin further includes a thermosetting resin that constitutes about 20% by weight or less of the resin.

59. The method of claim 58, wherein the fine particles and the polymer-based matrix material are mixed at a temperature between the glass transition temperature and the melting temperature of the polymer-based matrix material.

60. The method of claim 58, further comprising the step of:
   adding additives to the mixture of the polymer-based matrix material and the fine particles.

61. The method of claim 58, wherein the molten mixture is solidified by gradual cooling.

62. A method of forming a composite material, comprising the step of:
   dispersing fine particles of Rice Bran Ceramic (RBC) in a resin not including a Carbonized Rice Bran Ceramic (CRBC), wherein the mass ratio between the RBC and the resin is less than or equal to 30:70, wherein the resin includes at least one thermoplastic resin selected from the group consisting of polyamide, polyester and polyolefin resin and wherein the resin further includes a thermosetting resin that constitutes about 20% by weight or less of the resin.

63. The method of claim 62, further comprising the step of substantially uniformly dispersing the fine particles of RBC in the resin.

64. A composite material produced in accordance with the method of claim 63.

65. A composite material produced in accordance with the method of claim 62.

* * * * *